(12) United States Patent
Wilding et al.

(10) Patent No.: US 7,786,193 B2
(45) Date of Patent: Aug. 31, 2010

(54) THERMOPLASTIC STIFFENING MATERIAL USED FOR MANUFACTURING SHOES, AND A METHOD FOR THE PRODUCTION THEREOF

(75) Inventors: Emil Wilding, Birkenheide (DE); Markus Fath, Limburgerhof (DE); Stefan Frey, Hettenleidelheim (DE)

(73) Assignee: BK Giulini GmbH, Ludwigshafen (DE)

( * ) Notice: Subject to any disclaimer, the term of this patent is extended or adjusted under 35 U.S.C. 154(b) by 381 days.

(21) Appl. No.: 10/517,678

(22) PCT Filed: Mar. 27, 2004

(86) PCT No.: PCT/EP2004/003300

§ 371 (c)(1), (2), (4) Date: Sep. 23, 2005

(87) PCT Pub. No.: WO2004/090061

PCT Pub. Date: Oct. 21, 2004

(65) Prior Publication Data

US 2006/0154047 A1 Jul. 13, 2006

(30) Foreign Application Priority Data

Apr. 11, 2003 (DE) ................ 103 16 617

(51) Int. Cl.
*C08L 97/02* (2006.01)
*C08K 3/26* (2006.01)

(52) U.S. Cl. .................... 524/14; 524/13; 524/425

(58) Field of Classification Search ............ 524/13, 524/14, 425

See application file for complete search history.

(56) References Cited

U.S. PATENT DOCUMENTS

| 3,778,251 | A | | 12/1973 | Trask | |
|---|---|---|---|---|---|
| 4,717,496 | A | | 1/1988 | Brehmer et al. | |
| 4,820,769 | A | * | 4/1989 | Gaku et al. | 525/113 |
| 4,939,036 | A | * | 7/1990 | Reith | 428/349 |
| 5,525,663 | A | * | 6/1996 | Oien | 524/590 |
| 6,475,619 | B2 | * | 11/2002 | Goldberg | 428/375 |
| 2006/0121225 | A1 | * | 6/2006 | Lees et al. | 428/35.7 |

FOREIGN PATENT DOCUMENTS

| EP | 183 912 | 6/1986 |
|---|---|---|
| WO | WO 94/03211 | 2/1994 |

* cited by examiner

*Primary Examiner*—Peter Szekely
(74) *Attorney, Agent, or Firm*—Venable LLP; Keith G. Haddaway; Michael E. Nelson

(57) ABSTRACT

The invention relates to a novel thermoplastic stiffening material used for manufacturing shoes or shoe parts, and to an environmentally friendly method for the production thereof. The inventive material is proved in the form of a hot-melt adhesive/filling compound and is characterized in that it is comprised of one or more hot-melt adhesives and of one or more fillers, which are provided in quantities ranging from 50 to 15% by weight and which do not dissolve in the hot-melt adhesive. The hot-melt adhesive/filler compound simultaneously fulfills the following parameters: 1. MVR value between 2 and 6, preferably between 3 and 5 $cm^3/10$ min; 2. Surface tack, when measured according to DIN EN 14610 at 65° C., ranging from at least 10 N/2 cm, preferably 15 N/2 cm, particularly 20 N/2 cm; 3. Bonding value/peel resistance with regard to upper materials and linings of at least 30 N/5 cm when measured according to DIN 53357; 4. Longitudinal extension of no greater than 25%, preferably less than 20%, when measured at a temperature of 90° C.

17 Claims, No Drawings

THERMOPLASTIC STIFFENING MATERIAL USED FOR MANUFACTURING SHOES, AND A METHOD FOR THE PRODUCTION THEREOF

The present invention relates to a new type of thermoplastic reinforcing material, used in the production of shoes and/or shoe components, as well as an environment-friendly method for producing said material.

Reinforcing materials are used in the shoe industry for toe and heel caps, but also for fire-proof soles, side reinforcements and slip straps, heel liners and cap combinations. These reinforcing materials have long been used in modem shoe production processes to provide the finished shoe with a permanent form and good stability for use, once the assembly molding forms are removed, as well as to provide the shoe with the desired strength and/or rebounding elasticity. During the manufacturing process, the thermoplastic reinforcing materials normally bond under the effect of heat and pressure (activation) to the top material (e.g. leather) and, if necessary, to the lining material (e.g. leather or a textile material) and are fitted onto the molding form.

Reference DE 26 21 195 C discloses reinforcing materials in the form of flat goods, produced by coating a carrier material with a pulverized, meltable plastic material that additionally contains fillers. The meltable plastic materials include polyethylene, copolymers of the ethylene with vinyl acetate or methyl acrylate. The main object of this invention was to find means for increasing the amount of pulverized filler in the mixture of pulverized meltable plastic materials and thus obtain a high material strength. This object was solved with the discovery that the amount of filler material could be increased up to 100% by volume, relative to the amount of pulverized, meltable plastic material, if the particle-size distribution of both components is comparable. In that case, the melted plastic powder surrounds the individual filler particles completely and these filler particles assume the characteristics of the plastic material, meaning they behave like plastic materials. Wood flour and chalk were mentioned in this reference as filler materials. As a rule, such flat goods of thermoplastic material by themselves do not have a suitable adhesive characteristic at processing temperatures and consequently require an additional coating of hot-melt adhesive on their surface, so that they can bond permanently with the shaft components.

Reference EP 183 192 B2 discloses a material suitable for the reinforcement of shoes, which is capable of bonding directly. This material is characterized by the use of inert filler materials which consist totally or at least on their surface of plastic materials mixed with a meltable bonding agent. The meltable bonding agent can be polycaprolacton, for example, which proved to be particularly suitable because of its relatively low melting point at approximately 60° C. The ratio of bonding agent to filler material for the mixture is 70 to 20 weight % bonding agent and 30 to 80 weight % filler material, wherein the particle-size distribution of the filler material ranges from 50 to 500 µm. Critical to this invention was the fact that the filler materials consisted of inert plastic materials, which did not dissolve in the bonding agent in the activated state, meaning in the melting range for the bonding agent. Particularly suited for this was PVC [polyvinyl chloride], wherein the particle-size distributions in this case also had to be compatible, so that the mixture of bonding agent and filler material showed relatively good adherence. Furthermore mentioned therein as bonding agents were polyurethanes and modified polyethylene vinyl acetate. To achieve sufficient strength and/or stability for the processing, the use of a carrier material was generally required, wherein these carrier materials consisted of nonwovens, textile materials, or even release paper. Carrier materials of this type are necessary for the production. These reinforcing materials do not require additional hot-melt adhesives and, with a suitable component selection, it is possible to use up to 80% filler material, relative to the total coating. Even in the thinned out or ground down state, these coatings and/or reinforcing materials have the same adhesive and thermoplastic deformation characteristics as the "full" material. The hot-melt adhesives described herein become soft in the range between 50-80° C., allowing the filler material particles to bond through adhesion on their surface. Reinforcing materials for the shoe production are also described in a great number of other patents. For example, we want to mention the following references, but without acknowledging them, because their subject matters are not closely related to the subject matter of the present invention: WO 00/41585 A1, applicant Texon UK and WO 00/53416, applicant Texon UK.

According to reference EP 183 192, a preferred method for these reinforcing elements in the shoe production is the preheating of the reinforcing parts in connection with the thermoplastic softening and/or melting-on of the bonding agent (adhesive) prior to the manual insertion and positioning in the shoe shaft and the subsequent hot-pressing and/or cold-pressing for the shaping and simultaneous bonding, wherein radiation heat or contact heat is used for this pre-heating or "activating." To achieve sufficient mechanical stability and controlled surface stickiness for handling them in the hot state, these products are covered on both sides on the surface with a textile carrier or with open-mesh textile fabrics, wefts, nonwovens, or the like. This measure achieves a sufficiently high mechanical stability to allow an efficient mode of operation, along with a simultaneously controlled reduced surface tack since the adhesive is pushed through the textile surface cover during the processing under pressure. However, the high material costs for the textile materials and, even more importantly, the fact that recycling is not possible as a result of the textile component represent a considerable disadvantage. It must be mentioned herein that the "waste material" generated during the stamping out or grinding down (thinning of the edges) of the components made from flat goods can reach up to 30% of the starting material weight. Until now, it was difficult to combine the diametrically opposed requirements of having good bonding but low tack (stickiness) for working the components manually into the shoe shaft while in the hot state, along with sufficient coherence and/or stability at the processing temperature range of 50-100° C., which required, as previously described, a multi-layer design with textiles or coatings that jointly resulted in a usable reinforcing material. This production method had the disadvantage of high costs and lacked the option of recycling.

It is the object of the present invention to find hot-melt adhesive/filler material compounds suitable for all production methods, which simultaneously meet all of the above-described parameters without requiring a multi-layer design and thus make it possible to reuse the production waste materials, such as stamping grids and grinding chips, to form a raw material that is 100% identical to the melting compound.

It is furthermore the object of the present invention to select optimum thermoplastic polymers for meeting the strength and bonding/tack values required by the user, which can be used jointly with naturally occurring fillers such as wood, wood flour, cork products, but also with inert inorganic fillers such as chalk, kaolin etc.

It was surprisingly discovered that this object is solved with a thermoplastic reinforcing material in the form of a hot-melt adhesive/filler material compound, comprising:

1. one or several hot-melt adhesives in an amount of 50 to 95 weight %, with MVR[1] values (measured at 100° C., 21.6 kg acc. to DIN ISO 1133) ranging from 2 to 300, preferably from 10 to 20 cm$^3$/10 min and MVR—material volumetric flow rate DIN—German industrial standard; ISO—International Standards Organization EN—European Standards 2. one or several filler materials in amounts of 50 to 5 weight %, which do not dissolve in the hot-melt adhesive and that the hot-melt adhesive/filler material compound simultaneously meets the following parameters by having:

1. an MVR value between 2 and 6, preferably between 3 and 5 cm$^3$/10 min;
2. a surface stickiness (tack), measured at 65° C. according to DIN EN 14510, of at least 10N to maximum 60N, preferably 15N and especially preferred 30N;
3. a bonding value (peeling resistance) relative to the top material and lining of at least 30 N/5 cm, measured on the basis of DIN 53357;
4. a maximum longitudinal extension of 25%, preferably less than 20%, measured after 5 minutes inside the hot cabinet at 90° C.

The thermoplastic reinforcing material according to the invention, used for the shoe production, in the form of a hot-melt adhesive /filler material compound is specifically characterized in that the component a, the hot-melt adhesive, comprises a mixture of:

1. A linear polyester in amounts of 75 to 95 weight % and/or a thermoplastic polyurethane in amounts of 75 to 95 weight % and 2. An ethylene vinyl acetate copolymer in amounts of 0 to 25 weight % with a vinyl acetate content of 10 to 40%, preferably 25 to 30%, and that the filler material is selected from the group of inorganic, mineral filler materials, organic plant filler materials, plastic materials and mixtures thereof, taking the form of spherical, polyhedral particles with a particle-size distribution between 10 and 1000 µm, preferably ranging from 45 to 500 µm, or in the form of fibers with a length of 45 to 1000 µm, preferably 45 to 500 µm. The preferred filler material is wood flour having a particle size distribution of 45 to 500 µm. The filler material can also be chalk, in particular industrial chalk, with a particle-size distribution of 10 to 45 µm or a plastic material such as polyethyleneterephthalate (PET) with a particle-size distribution of 45 to 500 µm.

The surface stickiness measured at 65° C. according to DIN EN 14510 of the hot-melt adhesive/filler material compound, has a value of at least 10N, maximum 60N, preferably 15N and especially 30N. If the tackiness value exceeds 60N, the material becomes much more difficult to handle.

The longitudinal extension, which is representative of the material strength in the activated state, was measured in a hot cabinet at 90° C. The suspended sample strips, having a width of 2 cm, a length of 10 cm, and a thickness of 0.95 cm, were removed after 5 minutes of heat treatment from the hot cabinet and their longitudinal extension measured. The change as compared to the original length (8 cm) was indicated in %.

Hot-melt adhesives/filler material compounds with a maximum longitudinal extension of 20% at temperatures of 90° C. are optimally suited materials, provided all other parameters according to claim 1 are met.

A suitable method for producing the thermoplastic reinforcing material for the shoe production in the form of a hot-melt adhesive/filler material compound is characterized in that the hot-melt adhesive is melted at a temperature of up to a maximum 220° C. and that the filler material is then added by means of a metering device to the hot melt, by means of stirring or kneading. In the process, the moisture and exiting gases are suctioned off with a degassing device and the resulting plastic mass is subjected to a vacuum degassing.

The plastic mass, treated in this manner, can be processed further into reinforcement parts for shoes by using all known techniques for thermoplastic processing.

Hot-melt adhesive/filler material compound mixtures suitable for the invention are listed in Table 1. The measured values demonstrate that these compounds are suitable for shoe reinforcement materials.

TABLE 1

| formula | bonding activation at 90° C. + 5" cold-pressed against micro-fiber synthetic leather [N/5 cm] | change in length [%] (heat resistant) | MVR at 100° C. 21.6 kg/viscosity/ [cm$^3$/10 min] | tack for round sample Ø 2 cm [N] | main type of break in bond | suitability of material |
|---|---|---|---|---|---|---|
| 1 | 76 | 14 | 3.6 | 39.8 | NC/CF | yes |
| 2 | 65 | 25 | 6.3 | 32.2 | NC | yes/no |
| 3 | 55 | 19 | 3.8 | 21.5 | NC | yes |
| 4 | 57 | 13 | 1.8 | 10.1 | NC | no |
| 5 | 88 | 10 | 5.2 | 19.2 | NC | yes |
| 6 | 22 | 12 | 2.3 | <5 | NC | no |
| 7 | 49 | ≧25 | 8.2 | 35.2 | NC/CF | no |
| 8 | 59 | <25 | 2.1 | 14.8 | NC | yes/no |
| 9 | n.n | 27 | 2.8 | 18.3 | NC | no |
| 10 | n.n (1) | n.n (1) | 16.2 | 36.4 | CF | no |
| 11 | n.n (1) | n.n (1) | 67.7 | 37.6 | CF | no |
| 12 | n.n (1) | n.g (1) | 319.6 | 31.6 | CF | no |
| 13 | 0 | n.g | n.g | 0 | — | no |
| 14 | n.g | >5 | n.n (2) | 25 | NC | no |

The formulas 1 to 14 contain the following constituents:

1. 70 weight % poly(epsilon)-caprolacton with an average molecular weight of 80.000 g/mol and 30 weight % of wood flour and/or fibers (pinus pinea), having a particle-size distribution of 50-500 µm.
2. 80 weight % poly(epsilon)-caprolacton with an average molecular weight of 80.000 g/mol and 20 weight % of wood flour and/or fibers with a particle-size distribution of 150-500 µm.

3. 70 weight % poly(epsilon)-caprolacton with an average molecular weight of 80.000 g/mol and 30 weight % of wood flour and/or fibers with a particle-size distribution of 150-500 μm.
4. 60 weight % poly(epsilon)-caprolacton with an average molecular weight of 80.000 g/mol and 40 weight % of wood flour and/or fibers with a particle-size distribution of 150-500 μm.
5. 65 weight % poly(epsilon)-caprolacton with an average molecular weight of 80.000 g/mol, 5 weight % EVA [ethylene vinyl acetate], and 30 weight % of wood flour and/or fibers with a particle-size distribution of 150-500 μm.
6. 70 weight % of thermoplastic polyurethane with an MVR value of 20 to 35 $cm^3/10$ min, measured at 190° C. while subjected to 10 kg load and 30 weight % of wood flour and/or fibers with a particle-size distribution of 150-500 μm.
7. 70 weight % poly(epsilon)-caprolacton with an average molecular weight of 80.000 g/mol, 30 weight % of a commercially available industrial chalk by the company Omya, with an average particle size of 45 μm.
8. 70 weight % poly(epsilon)-caprolacton with an average molecular weight of 80.000 g/mol and 30 weight % of pulverized polyethyleneterephthalate (PET) as filler material with a particle-size distribution of 50-500 μm.
9. Thermoplastic polyurethane with an MVR value of 20 to 35 $cm^3/10$ min, measured at 190° C. and subjected to 10 kg load.
10. Poly(epsilon)-caprolacton with an average molecular weight of 80.000 g/mol.
11. Poly(epsilon)-caprolacton with an average molecular weight of 40.000 g/mol.
12. Ethylene vinyl acetate copolymers with 28% vinyl acetate content and a MFI [melt flow index] of 150 g/10 min at 190° C./2.16 kg.
13. Material as disclosed in DE 26 21 195 C.
14. Material as disclosed in EP 183 192 C1, Example 2.

The abbreviations used in the table have the following meanings:

n.n (1)=not detectable since the material is too unstable and cannot be processed while pre-activated, meaning hot;
n.n (2)=cannot be measured since it is the fabric component;
n.g.=not measured;
NC=incomplete coalescence—materials separate at the gluing joint, meaning between the two materials (compound and top material);
CF=break in cohesion, meaning a separation within the compound.

Summary of the Results:

The suitable materials 1, 3, 5 and 8 according to the invention stand out because they meet the desired values for all four criteria and are therefore within the so-called "product window." In contrast, the pure raw materials, such as the products 9, 10, 11 and 12, as well as the materials 13 and 14 according to references EP 183 192 and DE 26 21 195, are products without carriers which differ with respect to at least one criterion, are not usable, and are therefore outside of this product window. Table 1 furthermore shows that even plastics can be used to a limited degree as filler materials, but have extremely low cohesion because of their smooth surfaces.

Production Method

The hot-melt adhesive poly(epsilon)-caprolacton with an average molecular weight of 80.000 g/mol is melted on at a temperature of approximately 180° C. The filler material, a wood flour/fiber mixture with a particle-size distribution of 150-500 μm, is added to the hot melt in an amount of 5-30% with the aid of a metering device and is worked in by stirring and kneading it. The moisture and exiting gases are vacuumed off by means of a degassing device. A plastic mass is obtained which is subjected to a further vacuum degassing. Finally, the plastic mass treated in this way is fed to a multi-stage calender roller, wherein the temperature of the individual stages of the calender has a decreasing temperature profile, starting at 40° C. and ending below 20° C. The plastic mass is rolled flat in this calender and, following the cooling down, is pulled from the calender in the form of flat webs. The flat material obtained in this way can then be processed further in the standard manner by means of stamping and grinding to form the reinforcing parts (toe caps/heel caps) for shoes. The waste products that accumulate during the stamping and grinding process are collected and, following a rough comminuting (chopping process), can be returned directly to the production process or, alternatively, can be ground into powder and used as raw material in the production of reinforcement materials using powder-manufacturing technologies.

The hot-melt adhesive/filler material compound can also be granulated and, following renewed melting, the resulting granular material can be processed further by means of extrusion or calendering to form a flat foil.

A different suitable production method for the hot-melt adhesive/filler material compound according to the invention is the injection-molding technique, which allows producing reinforcing components in the form of injection-molded parts. The hot-melt adhesive/filler material compound according to the invention can also be ground into a fine powder having a particle size distribution of 50 to 1000 μm and can be used for producing a flat film for finishing the reinforcing parts. It is furthermore possible to use this hot-melt adhesive/filler material compound powder for producing three-dimensional reinforcing parts with the aid of known powder-processing techniques.

The reinforcing materials for shoes and/or the shoe components of reinforcing materials, produced with this hot-melt adhesive/filler material compound and the various production techniques have particularly good use characteristics.

The invention claimed is:

1. A thermoplastic reinforcing material for shoe production, in the form of a hot-melt adhesive/filler material compound, characterized in that it comprises
   a) one or several hot-melt adhesive(s) in amounts of 50 to 95 weight %, comprising one or more polymers, where the polymer(s) have an MVR values (measured at 100° C., 21.6 kg based on DIN ISO 1133) ranging from 2 to 300 $cm^3/10$ min and
   b) one or several filler materials in amounts of 50 to 5 weight %, which do not dissolve in the hot-melt adhesive; and
   the hot-melt adhesive/filler material compound simultaneously meets the following parameters by having:
   1) an MVR value between 2 and 6 $cm^3/10$ min;
   2) a surface stickiness/tack/measured according to DIN EN 14610 at 65° C. of at least 10N to maximally 60N;
   3) a bonding value/peeling strength/toward top materials and linings of at least 30 N/5 cm, measured on the basis of DIN 53357;
   4) a maximum longitudinal extension of 25% measured after 5 minutes in a hot cabinet at temperatures of 90° C.;
   wherein component a, the hot-melt adhesive, is present in amounts of 50-95% and comprises a mixture of 1) a linear polyester present in amounts of 75 to 100 weight % and/or a thermoplastic polyurethane present in amounts of 75 to 100 weight %, together with 2) ethylene vinyl acetate copolymers present in amounts of up to 25 weight % with a vinyl acetate content of 10 to 40 weight % and that component b, the filler material is present in an amounts of 50 to 5 weight % and is selected from the group of inorganic, mineral filler materials, organic plant filler materials, plastic materials and mixtures thereof, which are present in the form of spherical, polyhedral particles with a particle-size distribution between 45 and 1000 μm or in the form of fibers with a length of 45 to 1000 μm.

2. The reinforcing material as defined in claim 1, characterized in that the filler material is wood flour with a particle-size distribution of 45 to 500 μm.

3. The reinforcing material as defined in claim 1, characterized in that the filler material is chalk with a particle size distribution of 10 to 45 μm.

4. The reinforcing material as defined in claim 1, characterized in that the surface stickiness/tack/of the hot-melt adhesive/filler material compound has a value of 25 to 45 N.

5. The reinforcing material as defined in claim 1, characterized in that the longitudinal extension of the hot-melt adhesive/filler material compound is less than 20%, measured at temperatures of 90° C.

6. A method for producing the thermoplastic reinforcing material for the shoe production in the form of a hot-melt adhesive/filler material compound as defined in claim 1, characterized in that the hot-melt adhesive is melted on and that the filler material is added to the hot melt by means of a metering device and is worked in by stirring and kneading, that the moisture and exiting gases are suctioned off with a degassing device, that the resulting plastic mass is subjected to another vacuum degassing, and that the plastic mass, pretreated in this way, is conveyed away for further processing.

7. The method for producing the thermoplastic reinforcing material for the shoe production in the form of a hot-melt adhesive/filler material compound as defined in claim 1, characterized in that the hot-melt adhesive/filler material compound is granulated, that the granulated material is melted again and is then processed further by means of extrusion or calendering to form a flat foil.

8. The method for producing the thermoplastic reinforcing material for the shoe production in the form of a hot-melt adhesive/filler material compound as defined in claim 1, characterized in that the hot-melt adhesive/filler material compound is processed further as raw material into reinforcing parts, using injection-molding machines.

9. A fine powder having a particle-size distribution of 50 to 1000 μm for producing a flat foil, wherein the fine powder is formed from a hot-melt adhesive/filler material compound as defined in claim 1.

10. A three-dimensional reinforcing part formed from a fine powder having a particle-size distribution of 50 to 1000 μm, which is formed from a hot-melt adhesive/filler material compound as defined in claim 1.

11. Shoes comprising a reinforcing material as defined in claim 1.

12. A thermoplastic reinforcing material according to claim 1, wherein the one or several hot-melt adhesive(s) have MVR values from 10 to 20 $cm^3$/10 min.

13. A thermoplastic reinforcing material according to claim 1, wherein the hot-melt adhesive/filler material compound has an MVR value between 3 and 5 $cm^3$/10 min.

14. A thermoplastic reinforcing material according to claim 1, wherein the hot-melt adhesive/filler material compound has a surface stickiness/tack of at least 15N.

15. A thermoplastic reinforcing material according to claim 1, wherein the hot-melt adhesive/filler material compound has a surface stickiness/tack of at least 30N.

16. A thermoplastic reinforcing material according to claim 1, wherein the vinyl acetate content is 15 to 25 weight %.

17. A thermoplastic reinforcing material according to claim 1, wherein the filler material is present in the form of spherical, polyhedral particles with a particle size distribution between 45 and 500 μm, or in the form of fibers with a length of 45 to 500 μm.

\* \* \* \* \*